Nov. 28, 1944.   J. JANDASEK   2,363,731
TURBO TRANSMISSION
Filed April 8, 1941
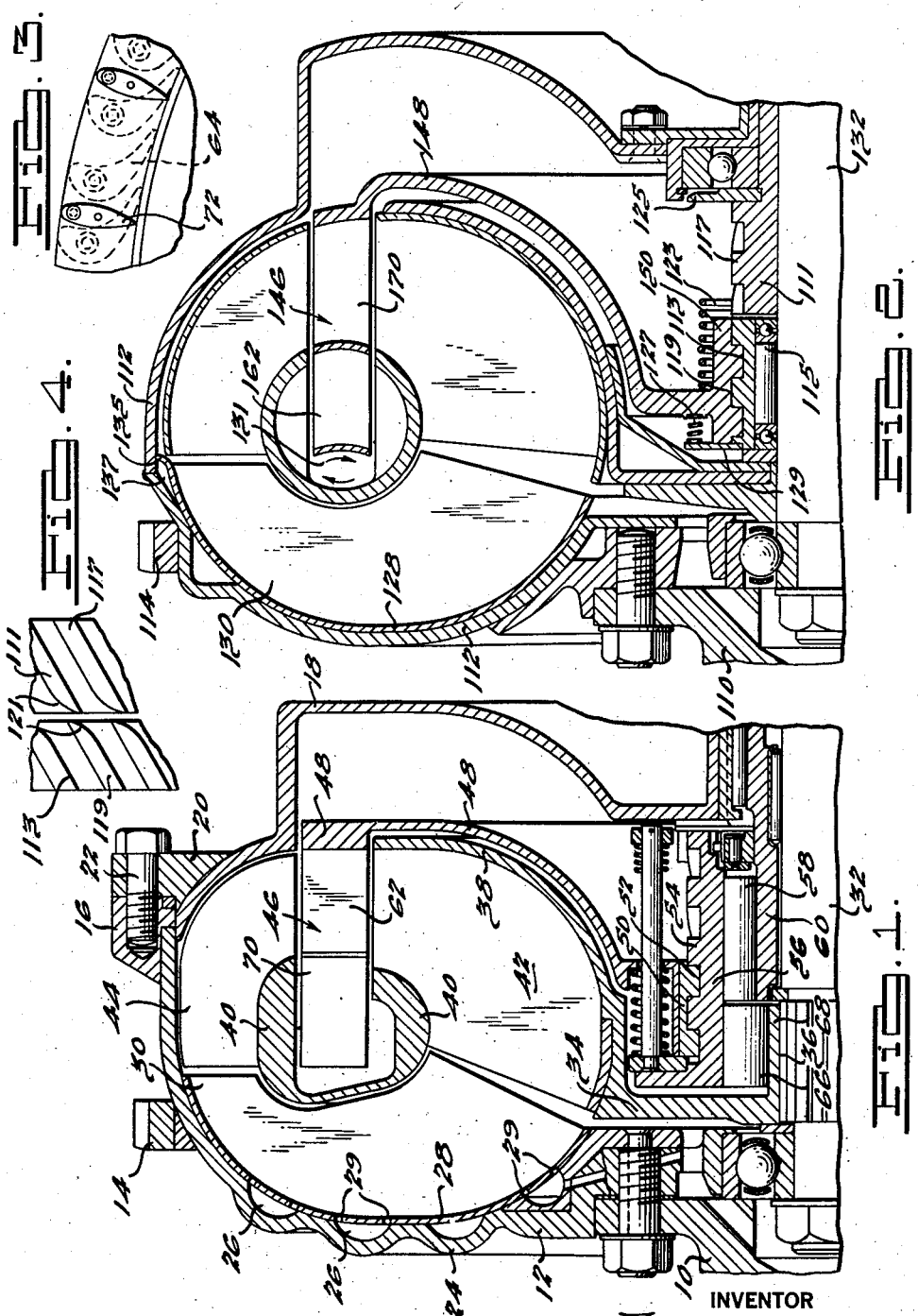
INVENTOR
Joseph Jandasek.
BY
ATTORNEYS.

Patented Nov. 28, 1944

2,363,731

UNITED STATES PATENT OFFICE 2,363,731

TURBOTRANSMISSION

Joseph Jandasek, Detroit, Mich., assignor to Bendix Aviation Corporation, South Bend, Ind., a corporation of Delaware Application April 8, 1941, Serial No. 387,462

4 Claims. (Cl. 60—54)

This invention relates to transmissions and more particularly to fluid actuated means whereby power may be transmitted from one shaft to another at varying torque ratios.

An object of this invention is to provide a fluid deflecting member having a plurality of spaced channel portions adapted to be selectively positioned in a power transmitting fluid circuit to operate the device as a torque converter or as a turboclutch wherein the shiftable member operates as an energy absorbing member.

A further object of the invention resides in the provision of a guide wheel member adapted to be introduced into a power transmitting fluid circuit to operate the device as a torque converter and having an auxiliary energy absorbing portion adapted to be introduced into the power transmitting fluid circuit to absorb energy from the circulating fluid thereby in effect forming a multistage turbine member.

Another object is to provide one-way brake means positioned between a stationary member and a guide wheel hub of a turbounit whereby a guide wheel member may be locked against rotation in one direction to operate the device as a torque converter, and one-way driving means positioned between the guide wheel member and a turbine member whereby the guide wheel member may operate as an auxiliary turbine when shifted to a different settable position.

Still another object resides in the provision of a turbotransmission having an axially shiftable guide wheel member mounted on a helical spline wherein one-way brake means are provided between the helical spline and a stationary member to lock the guide wheel member against rotation in one direction to operate the turbounit as a torque converter and wherein one-way driving means operable in the opposite direction are interposed between the helical member and the turbine member to transform the guide wheel member to operate as an auxiliary energy absorbing turbine member in another settable position on the helical member.

Yet a still further object of this invention resides in the provision of a plurality of axially spaced guide wheel hub supporting members whereby an axially shiftable guide wheel member may be locked against rotation in the power transmitting fluid circuit to transform the device to operate as a torque converter or whereby the axially shiftable member may be locked to a driven shaft to operate as an auxiliary turbine.

Another object is to provide a movable guide wheel member having an operative portion adapted to be selectively introduced into or withdrawn from a turbine shroud member associated with a power transmitting fluid circuit to operate the device as a torque converter, and wherein fluid pressure energy developed by relative rotation between spaced shroud members of the guide wheel and turbine members may develop a force tending to initiate movement of the guide wheel member to transform the device to operate as a turboclutch.

Still a further object is to provide novel means associated with a turbotransmission housing whereby a portion of the power transmitting fluid may be progressively passed through a heat radiating chamber associated with the turbohousing.

Still another object resides in the provision of a housing having heat radiating projections adapted to receive spaced vanes positioned to lie adjacent the inner wall of the housing to substantially close the space between the heat radiating chamber and the interior of the turbounit to provide a cooling space between a smooth surface on the inside and a corrugated cooling surface on the outside.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view of a turbotransmission embodying the present invention.

Fig. 2 is a longitudinal sectional view of a device embodying a modified form of the invention.

Fig. 3 is a schematic view in axial projection illustrating the shape of the turbine and guide wheel vanes utilized in the embodiments of the invention illustrated in Figs. 1 and 2.

Fig. 4 is a partial plan view of a pair of spaced rotatable and stationary helixes illustrated in Fig. 2.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to Fig. 1, it will be observed that a driving shaft 10 is provided with a housing 12 having a starter ring gear 14 and a flange 16 carried thereby. The flange 16 is adapted to receive a radially extending cover plate 18 terminating in a flange 20 adapted to be detachably connected to the flange 16 by suitable bolts 22.

The radially extending portion of the housing 12 is provided with a plurality of preferably circumferentially extending corrugations 24 whereby liquid cooling chambers 26 may be formed between the corrugations 24 and radially extending flanges 28 carried by impeller blades 30 forming an impeller channel. A plurality of spaced apertures 29 projecting through the flanges 28 may be provided to admit circulating liquid into the cooling chambers 26. If desired, the flanges 28 may be spaced apart slightly to provide a space to admit liquid into the cooling chambers 26.

A driven shaft 32 is preferably coaxially aligned with the driving shaft 10 and engages a turbine hub 34 through suitable splines 36. The turbine hub 34 carries a turbine web 38 which supports a turbine shroud 40 through suitable second stage turbine vanes 42. The turbine shroud 40 is provided with first stage turbine vanes 44 aligned with the impeller channel defined by the impeller blades 30.

Interposed between the first stage turbine vanes 44 and the second stage turbine vanes 42 is an axially movable guide wheel member 46 carried by a guide wheel web 48 suitably mounted on a guide wheel hub 50 having internal helical threads 52 cooperating with external helical threads 54 carried by a sleeve 56. One-way brake means 58 may be interposed between the sleeve 56 and a stationary member 60 to prevent backward rotation of the guide wheel 46 on the sleeve 56 when the device is operating as a torque converter at which time the channel 62 having fluid directing vanes 64 (Fig. 3) is positioned in the power transmitting fluid circuit between the first stage turbine 44 and the second stage turbine 42.

One-way driving means 66 interposed between the sleeve 56 and an axially extending flange 68 carried by the turbine hub 34 may be provided to prevent the guide wheel 46 from rotating freely in the forward direction in the power transmitting fluid circuit when the guide wheel 46 is shifted axially to position a channel 70 having fluid directing turbine vanes 72 in the power transmitting fluid circuit between the first stage turbine 44 and the second stage turbine 42. In this position the circulating fluid impinges upon the turbine vanes 72 thereby transferring energy through the web 48, guide wheel hub 50, sleeve 56, one-way driving means 66, flange 68, to the driven shaft 32.

The embodiment of the invention shown in Fig. 2 is similar in many respects to that illustrated in Fig. 1. Corresponding parts have therefore been given corresponding reference numerals with the addition of 100.

It will be observed that a stationary helix 111 is coaxially mounted relative to the driven shaft 132 and that a rotatable helix 113 is mounted on the driven shaft 132 by way of a one-way driving means 115. Referring to Fig. 4, it will be observed that the external threads 117 and 119 respectively of the stationary and rotatable helixes 111 and 113 respectively are bevelled as illustrated at 121 to facilitate engagement of the respective helixes with the internal helical threads of the guide wheel hub 150.

In the operation of this device it will be observed that a turbine channel 170 is positioned adjacent the guide wheel flange 148 and that when the turbine channel 170 is introduced into the power transmitting fluid circuit between the first stage turbine 44 and the second stage turbine 42 power is transmitted from the power transmitting fluid through the flange 148, guide wheel hub 150, rotary helix 113, one-way driving means 115 to the driven shaft 132. In this position the guide wheel member operates as an auxiliary power absorbing turbine thereby increasing the efficiency of the transmission of power from the driving shaft 110 to the driven shaft 132.

In the operation of the device as a turbocoupling or fluid flywheel, when the turbine or energy absorbing member becomes overloaded and the direction of fluid flow from the first stage turbine changes to exert a backwardly directed reaction on the guide wheel member, the guide wheel member is rotated on the rotary helix 113, and shifts axially into engagement with the stationary helix 111. A spring 123 carried by the guide wheel hub 150 engages with a flange 125 associated with the stationary helix 111 to stop the axial movement of the guide wheel member. Another spring 127 positioned between a flange 129 and the guide wheel flange 148 may be provided to initiate axial movement of the guide wheel member 146 to transform the device to operate as a torque converter rather than as a turboclutch. It will be observed that when the device becomes overloaded while operating as a turboclutch, the guide wheel member 146 rotates relative to the impeller shroud member whereupon the fluid in a chamber 131 starts a vortex motion to exert an axial force to initiate movement of the blades of the turbine channel 170 out of the power transmitting fluid circuit.

Axial shifting of the guide wheel hub onto the stationary helix 111 moves the guide wheel channel 162 into the power transmitting fluid circuit whereupon the device operates to transmit power as a torque converter. It will be observed that the flange 128 of the impeller vanes 130 adjacent the discharge from the impeller are curved downwardly to engage the housing 112 as illustrated at 135 whereupon a space 137 is provided between the housing 112 and the flange 128 to receive welding material which may inadvertently be released during the operation of welding the impeller blades into the housing.

Features disclosed but not claimed herein are being claimed in my co-pending application, Serial Number 492,537, filed June 28, 1943.

I claim:

1. A fluid transmission comprising a drive shaft having an impeller, a driven shaft having a turbine aligned with the impeller and cooperating therewith to form a power transmitting fluid circuit, a stationary member having a threaded portion concentrically mounted on the driven shaft, a rotatable threaded hub concentrically mounted on the driven shaft adjacent the threaded portion of the stationary member, one-way driving means between the threaded hub and the driven shaft, a guide wheel hub having internal threads adapted to engage the threaded portions of the rotatable hub and stationary members and to move axially relative to the driven shaft to occupy positions wholly on either the rotatable hub or the threaded portion of the stationary member, the adjacent radially extended edges of the threads of the stationary and rotatable hub members being bevelled in opposite directions to facilitate axial movement of the guide wheel hub on the stationary and rotatable hub members, spaced guide wheel vanes carried by the guide wheel hub and having fluid deflecting blades of varied contour adapted to be positioned in the fluid circuit to operate the transmission as a torque converter or as a fluid clutch, the torque converter vanes being positioned in the fluid circuit when the guide wheel hub is on the threaded portion of the stationary member whereby the guide wheel member is locked against rotation and the fluid clutch operating vanes being positioned in the fluid circuit when the guide wheel hub is on the rotatable hub to absorb energy from the power transmitting fluid and transmit it to the driven shaft through the one-way driving means interposed between the rotatable hub and the driven shaft.

2. A fluid transmission comprising a drive shaft having an impeller, a driven shaft having a turbine aligned with the impeller and cooperating therewith to form a power transmitting fluid circuit, a stationary member having a helically threaded portion concentrically mounted on the driven shaft, a rotatable helically threaded hub concentrically mounted on the driven shaft adjacent the helically threaded portion of the stationary member, one-way driving means between the helically threaded hub and the driven shaft, a guide wheel hub having internal helical threads adapted to engage the helically threaded portions of the rotatable hub and stationary members and to move axially relative to the driven shaft to occupy positions wholly on either the rotatable hub or the helically threaded portion of the stationary member, spaced guide wheel vanes carried by the guide wheel hub and having fluid deflecting blades of different contour adapted to be positioned in the fluid circuit to operate the transmission as a torque converter or as a fluid clutch, the torque converter vanes being positioned in the fluid circuit when the guide wheel hub is on the helically threaded portion of the stationary member whereby the guide wheel member is locked against rotation and the fluid clutch operating vanes being positioned in the fluid circuit when the guide wheel hub is on the rotatable hub to absorb energy from the power transmitting fluid and transmit it to the driven shaft through the one-way driving means interposed between the rotatable hub and the driven shaft.

3. In a fluid transmission a driving shaft having an impeller, a driven shaft having turbine cooperating with the impeller to form a power transmitting fluid circuit, a stationary member having a helically threaded portion concentrically mounted on the driven shaft, a stop positioned adjacent one end of the helically threaded portion of the stationary member, a rotatable sleeve having a helically threaded portion operably connected to the driven shaft and positioned adjacent the helically threaded portion of the stationary member, a stop positioned adjacent one end of the helically threaded sleeve, a guide wheel having spaced fluid deflecting blades adapted to be alternately positioned in the fluid circuit to operate the transmission as a torque converter or as a fluid clutch, a helically threaded hub for the guide wheel movable axially on the helically threaded portions of the stationary member and helically threaded sleeve to engage the stop associated with the helically threaded portion of the stationary member and lock the guide wheel member against rotation to operate the transmission as a torque converter and in another position to engage the stop member associated with the helically threaded sleeve to lock the guide wheel member to the rotatable sleeve when the transmission is operating as a fluid clutch to absorb energy from the power transmitting fluid and transmit it to the driven shaft.

4. In a fluid transmission a driving shaft having an impeller, a driven shaft having turbine cooperating with the impeller to form a power transmitting fluid circuit, a stationary member having a threaded portion concentrically mounted on the driven shaft, a stop positioned adjacent one end of the threaded portion of the stationary member, a rotatable sleeve having a threaded portion concentrically mounted on the driven shaft and positioned adjacent the threaded portion of the stationary member, a stop positioned adjacent one end of the threaded sleeve, one-way driving means between the threaded sleeve and the driven shaft, a guide wheel having spaced fluid deflecting blades of different contour adapted to be alternately positioned in the fluid circuit to operate the transmission as a torque converter or as a fluid clutch, a threaded hub for the guide wheel movable axially on the threaded portions of the stationary member and threaded sleeve to engage the stop associated with the threaded portion of the stationary member in one position and lock the guide wheel member against rotation to operate the transmission as a torque converter and in another position to engage the stop member associated with the threaded sleeve to lock the guide wheel member to the rotatable sleeve when the transmission is operating as a fluid clutch to absorb energy from the power transmitting fluid and transmit it through said one-way driving means to the driven shaft.

JOSEPH JANDASEK.